(12) United States Patent
Ünsal et al.

(10) Patent No.: US 9,048,478 B2
(45) Date of Patent: Jun. 2, 2015

(54) POLYMER ELECTROLYTE MEMBRANE BASED ON POLYAZOLE

(75) Inventors: Ömer Ünsal, Mainz (DE); Sigmar Bräuninger, Hemsback (DE); Jörg Belack, Mainz (DE); Oliver Gronwald, Frankfurt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/091,341

(22) Filed: Apr. 21, 2011

(65) Prior Publication Data

US 2011/0262835 A1 Oct. 27, 2011

Related U.S. Application Data

(60) Provisional application No. 61/326,672, filed on Apr. 22, 2010.

(51) Int. Cl.

| | |
|---|---|
| *H01M 8/10* | (2006.01) |
| *H01M 8/04* | (2006.01) |
| *C08J 5/20* | (2006.01) |
| *B01J 49/00* | (2006.01) |

(Continued)

(52) U.S. Cl.
CPC ............ *H01M 8/103* (2013.01); *H01M 8/1027* (2013.01); *H01M 8/1032* (2013.01); *H01M 8/1048* (2013.01); *H01M 8/1051* (2013.01); *H01M 8/1081* (2013.01); *Y02E 60/521* (2013.01); *C08J 5/2256* (2013.01)

(58) Field of Classification Search
USPC ................ 429/33, 433; 521/27; 523/1; 532/1
See application file for complete search history.

(56) References Cited

U.S. PATENT DOCUMENTS

| | | |
|---|---|---|
| 4,191,618 A | 3/1980 | Coker et al. |
| 4,212,714 A | 7/1980 | Coker et al. |

(Continued)

FOREIGN PATENT DOCUMENTS

| | | |
|---|---|---|
| CN | 1558457 | 12/2004 |
| CN | 1720632 | 1/2006 |

(Continued)

OTHER PUBLICATIONS

Hull, Derek ; An Introduction to Composite Materials New York (C) 1985 Cambridge University Press).*

(Continued)

*Primary Examiner* — Patrick Ryan
*Assistant Examiner* — Aaron Greso
(74) *Attorney, Agent, or Firm* — Drinker Biddle & Reath LLP

(57) ABSTRACT

Proton-conducting polymer electrolyte membrane based on a polyazole salt of an inorganic or organic acid which is doped with an acid as electrolyte, wherein the polyazole salt of the organic or inorganic acid has a lower solubility in the acid used as electrolyte than the polyazole salt of the acid used as electrolyte, a process for producing the inventive proton-conducting polymer electrolyte membrane, a membrane-electrode assembly comprising at least two electrochemically active electrodes which are separated by a polymer electrolyte membrane, wherein the polymer electrolyte membrane is a proton-conducting polymer electrolyte membrane according to the invention, and a fuel cell comprising at least one membrane-electrode assembly according to the invention.

29 Claims, 2 Drawing Sheets

(51) Int. Cl.
*C08G 61/02* (2006.01)
*C08J 3/00* (2006.01)
*C07D 487/00* (2006.01)
*C08J 5/22* (2006.01)

(56) References Cited

U.S. PATENT DOCUMENTS

| | | | |
|---|---|---|---|
| 4,333,805 | A | 6/1982 | Davidson et al. |
| 5,525,436 | A | 6/1996 | Savinell et al. |
| 5,738,905 | A | 4/1998 | Bevers |
| 5,761,793 | A | 6/1998 | Bevers et al. |
| 5,998,057 | A | 12/1999 | Koschany et al. |
| 7,229,553 | B2 | 6/2007 | Uensal et al. |
| 7,235,320 | B2 | 6/2007 | Calundann et al. |
| 7,736,779 | B2 | 6/2010 | Uensal et al. |
| 2004/0247974 | A1 | 12/2004 | Uensal et al. |
| 2005/0084727 | A1* | 4/2005 | Kiefer et al. ............... 429/33 |
| 2006/0183012 | A1 | 8/2006 | Uensal et al. |
| 2008/0182153 | A1 | 7/2008 | Jang et al. |
| 2008/0280182 | A1 | 11/2008 | Uensal et al. |
| 2008/0308491 | A1* | 12/2008 | Haring ............... 210/500.21 |
| 2009/0258274 | A1 | 10/2009 | Uensal et al. |
| 2009/0298189 | A1* | 12/2009 | Sundermeyer et al. ....... 436/161 |
| 2010/0164148 | A1 | 7/2010 | Uensal et al. |
| 2010/0216051 | A1 | 8/2010 | Uensal et al. |

FOREIGN PATENT DOCUMENTS

| | | | | |
|---|---|---|---|---|
| CN | 101523642 | | 9/2009 | |
| DE | 19509748 | A1 | 10/1996 | |
| DE | 19509749 | A1 | 10/1996 | |
| DE | 19757492 | A1 | 7/1999 | |
| DE | 10109829 | A1 | 9/2002 | |
| DE | 10110752 | A1 | 9/2002 | |
| DE | 10117687 | A1 | 10/2002 | |
| DE | 10246461 | A1 | 4/2004 | |
| DE | 102006036019 | A1 | 2/2008 | |
| DE | 102006054737 | * | 5/2008 | .............. H01M 8/10 |
| WO | WO-92/15121 | A1 | 9/1992 | |
| WO | WO-97/20358 | A1 | 6/1997 | |
| WO | WO-00/26982 | A2 | 5/2000 | |
| WO | WO-00/44816 | A1 | 8/2000 | |
| WO | WO 03/074596 | * | 9/2003 | ................ C08J 5/22 |
| WO | WO 2006080766 | * | 8/2006 | .............. H01M 8/10 |
| WO | WO 2007/131498 | * | 11/2007 | ........... C07D 233/06 |
| WO | WO-2011/003884 | A1 | 1/2011 | |
| WO | WO-2011/020843 | A1 | 2/2011 | |

OTHER PUBLICATIONS

Nasa Contractor Report NASA CR-1723 Marks et al Washington DC May 1971.*

International Search Report dated Sep. 8, 2011, in International Application No. PCT/IB2011/051709.

Belieres, J., et al., "Binary inorganic salt mixtures as high conductivity liquid electrolytes for >100 ° C fuel cells," Chem. Commun., 2006, pp. 4799-4801.

Wainright, J.S., et al., "Acid-Doped Polybenzimidazoles: A New Polymer Electrolyte," J. Electrochem. Soc., Jul. 1995, vol. 142, No. 7, pp. L121-L123.

Extended European search report for EP Application No. 11771674.6 dated Feb. 3, 2014.

* cited by examiner

POLYMER ELECTROLYTE MEMBRANE BASED ON POLYAZOLE

CROSS-REFERENCE TO RELATED APPLICATIONS

This application claims benefit (under 35 USC 119(e)) of U.S. Provisional Application 61/326,672, filed Apr. 22, 2010 which is incorporated by reference.

BACKGROUND OF THE INVENTION

The present invention relates to a proton-conducting polymer electrolyte membrane based on a polyazole salt of an inorganic or organic acid which is doped with an acid as electrolyte, a process for producing the proton-conducting polymer electrolyte membrane, a membrane-electrode assembly comprising the proton-conducting polymer electrolyte membrane and a fuel cell comprising the membrane-electrode assembly of the invention.

Proton-conducting, i.e. acid-doped, polyazole membranes for use in PEM fuel cells are known from the prior art. The basic polyazole films are generally doped with concentrated phosphoric acid or sulfuric acid and then act as proton conductors and separators in polymer electrolyte membrane fuel cells (PEM fuel cells). Due to the excellent properties of the polyazole polymer, such polymer electrolyte membranes can, when processed to produce membrane-electrode assemblies (MEAs), be used in fuel cells at long-term operating temperatures above 100° C., in particular above 120° C. This high long-term operating temperature allows the activity of the noble metal-based catalysts comprised in the membrane-electrode assembly to be increased. Particularly when using reformates derived from hydrocarbons, significant amounts of carbon monoxide are comprised in the reformer gas and these usually have to be removed by means of a complicated gas treatment or gas purification. The opportunity of increasing the operating temperature enables significantly higher concentrations of carbon monoxide impurities to be tolerated in the long term.

The use of polymer electrolyte membranes based on polyazole polymers enables, firstly, the complicated gas treatment or gas purification to be partly dispensed with and, secondly, the catalyst loading in the membrane-electrode assembly to be reduced. Both are indispensible prerequisites for mass use of PEM fuel cells, since otherwise the costs of a PEM fuel cell system are too high.

J. S. Wainright et al., J. Electrochem. Soc., Vol. 142, No. 7, July 1995, L121-L123, relates to polybenzimidazole films which are doped with phosphoric acid and are potential polymer electrolytes for use in hydrogen/air and direct methanol fuel cells. The electrolytes have a low permeability for methanol vapor, as a result of which the negative effects on the methanol crossover which are usually observed in direct methanol fuel cells can be reduced.

DE 101 176 87 A1 relates to proton-conducting polymer membranes which are based on polyazoles and have a high specific conductivity, in particular at operating temperatures above 100° C., and make do without additional fuel gas humidification. The proton-conducting polymer membranes according to DE 101 176 87 A1 can be obtained by a process comprising the following steps:

A) reaction of one or more aromatic tetramino compounds with one or more aromatic dicarboxylic acids or esters thereof in the melt at temperatures of 350° C., B) dissolution of the solid prepolymers obtained as per step A) in polyphosphoric acid, C) heating of the solution which can be obtained as per step B) under inert gas to temperatures of 300° C. to form the dissolved polyazole polymer, D) formation of a membrane using a solution of the polyazole polymers as per step C) on a support and E) treatment of the membrane formed in step D) until it is self-supporting.

DE 10 2006 036019 A1 relates to a membrane-electrode assembly comprising at least two electrochemically active electrodes which are separated by at least one polymer electrolyte membrane, with the polymer electrolyte membrane having reinforcing elements which penetrate at least partly through the polymer electrolyte membrane. The membrane-electrode assembly is preferably obtained by a process in which (i) a polymer electrolyte membrane is shaped in the presence of the reinforcing element, (ii) the membrane and the electrodes are assembled in the desired order.

The membrane-electrode assembly is particularly suitable for use in fuel cells.

The abovementioned polymer membranes based on polyazoles are generally operated in the presence of phosphoric acid as electrolyte.

However, at a high phosphoric acid content, the membranes are soft and therefore have only limited mechanical strength. In addition, the mechanical stability decreases with increasing temperature and the solubility of the polymer framework is increased. In the upper region of the typical operating window of a fuel cell (from about 160 to 180° C.), this can lead to durability problems. Furthermore, the polymer electrolyte membranes can be dissolved or flow away at relatively high temperatures under unfavorable operating conditions. The consequence is failure of the membrane-electrode assembly comprising the abovementioned polymer electrolyte membrane.

It is therefore an object of the present invention to reduce the solubility of polymer electrolyte membranes based on polyazoles in the acid used as electrolyte, preferably phosphoric acid, and to improve the mechanical stability of the membrane.

J.-P. Belieres et al., Chem. Commun., 2006, 4799-4801, describe polymer electrolyte membranes in which ionic liquids are used instead of phosphoric acid as electrolytes. However, polymer electrolyte membranes which comprise phosphoric acid as electrolyte but have a reduced solubility in phosphoric acid compared to polymer electrolyte membranes having phosphoric acid as electrolyte which are customarily used are not disclosed in J.-P Belieres et al.

BRIEF SUMMARY OF THE INVENTION

The abovementioned object is achieved by a proton-conducting polymer electrolyte membrane based on a polyazole salt of an organic or inorganic acid which is doped with an acid as electrolyte, with the polyazole salt of the organic or inorganic acid having a lower solubility in the acid used as electrolyte than the polyazole salt of the acid used as electrolyte.

DETAILED DESCRIPTION OF THE INVENTION

Figure 1:
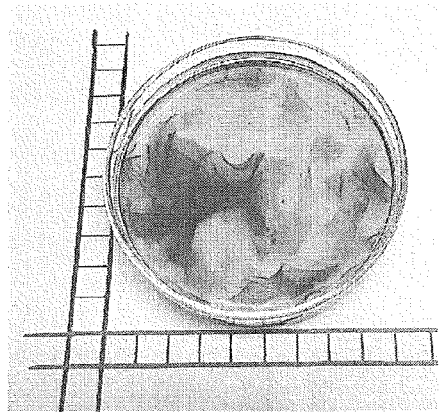
FIGS. 1-3 show the solubility of the membranes from Examples 1, 2 and 3.

To achieve proton conductivity of the polymer electrolyte membrane, the polymer electrolyte membrane based on a polyazole salt of an organic or inorganic acid is doped with an acid as electrolyte. Here, it is in principle possible to use all known Lewis and Brønsted acids, preferably inorganic Lewis and Brønsted acids, as electrolyte.

Furthermore, it is also possible to use polyacids, in particular isopolyacids and hetero-polyacids and also mixtures of various acids. For the purposes of the present patent application, heteropolyacids are inorganic polyacids which have at least two different central atoms and are formed in each case from weak, polybasic oxo acids of a metal, e.g. Cr, Mo, V or W, and a nonmetal, e.g. As, I, P, Se, Si or Te, as partially mixed anhydrides. They include, for example, 12-molybdophosphoric acid and 12-tungsto-phosphoric acid. A polyacid which is preferably used is polyphosphoric acid.

For the purposes of the present patent application, the term polyphosphoric acid refers to commercial polyphosphoric acids. The polyphosphoric acids $H_{n+2}P_nO_{3n+1}$ (n>1) usually have a content, calculated as $P_2O_5$ (acidimetric) of at least 83%.

Particular preference is given to using sulfuric acid and/or phosphoric acid, or compounds which liberate these acids, e.g. on hydrolysis, as electrolyte. Very particular preference is given to using phosphoric acid as electrolyte. Here, highly concentrated acids are generally used. The concentration of the phosphoric acid which is particularly preferably used is generally at least 50% by weight, preferably at least 80% by weight, based on the total weight of the electrolyte. The remaining up to 50% by weight, preferably up to 20% by weight, is generally water.

The conductivity of the polymer membrane can be influenced via the degree of doping. Here, the conductivity generally increases with increasing amount of electrolyte until a maximum value is reached. For the purposes of the present patent application, the amount of electrolyte (degree of doping) will be given as mole of acid per mole of repeating unit of the polymer. According to the invention, preference is given to a degree of doping of from 3 to 80, particularly preferably from 5 to 60, very particularly preferably from 12 to 60.

The durability and the mechanical membrane stability in the acid used as electrolyte, particularly preferably phosphoric acid, can be significantly improved by use of the proton-conducting polymer electrolyte membranes according to the present invention without the performance of the polymer electrolyte membrane in the fuel cell being adversely affected.

Organic or inorganic acids suitable for forming the polyazole salt are all acids as long as they form a polyazole salt which is less soluble in the electrolyte, preferably phosphoric acid, than is the polyazole salt of the electrolyte.

Suitable inorganic acids are, for example, $HNO_3$, sulfuric acid, sulfates such as $K_2SO_4$.

Suitable organic acids are aliphatic or aromatic acids which are preferably perfluorinated.

Preferred organic and inorganic acids are thus selected from the group consisting of perfluorinated phenols such as pentafluorophenol, perfluorinated phenyl alcohols, $K_2SO_4$, $HNO_3$, $FSO_3H$, $HPO_2F_2$, $H_2SO_3$, $HOOC-COOH$, sulfonic acids such as $CH_3SO_3H$, perfluorinated sulfonic acids such as $CF_3SO_3H$, $CF_3CF_2SO_3H$, etc, perfluorosulfonamides such as $(CF_3)_2SO_2NH$, $(CF_3CF_2)_2SO_2NH$, $(CF_3CF_2CF_2)_2SO_2NH$, etc., perfluorinated phosphonic acids such as $CF_3PO_3H_2$, $CF_3CF_2PO_3H_2$, $CF_3CF_2CF_2PO_3H_2$ etc. and perfluoroalkyl-carboxylic acids.

Particularly preferred organic and inorganic acids are pentafluorophenol, $CH_3SO_3H$, $CF_3SO_3H$, $CF_3CF_2SO_3H$, $(CF_3)_2SO_2NH$, $(CF_3CF_2)_2SO_2NH$, $(CF_3CF_2CF_2)_2SO_2NH$, $CF_3PO_3H_2$, $CF_3CF_2PO_3H_2$ and $CF_3CF_2CF_2PO_3H_2$.

Very particular preference is given to using the salt of pentafluorophenol as polyazole salt.

The polyazole salt used according to the invention in the proton electron-conducting polymer electrolyte membranes is preferably based on one or more polyazoles.

Polyazoles which are preferably used are polyazoles which comprise recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII).

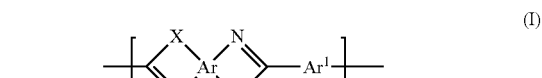

(I)

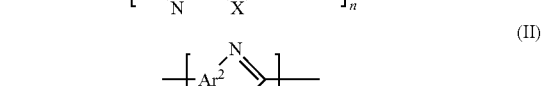

(II)

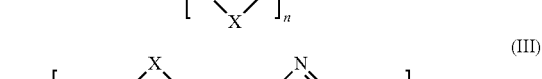

(III)

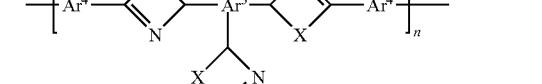

(IV)

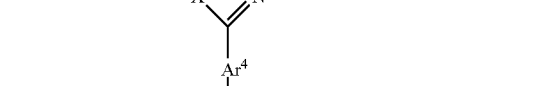

(V)

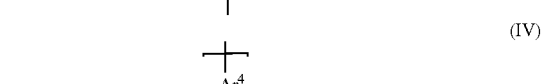

(VI)

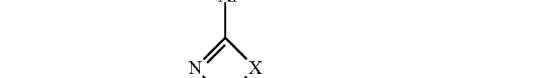

(VII)

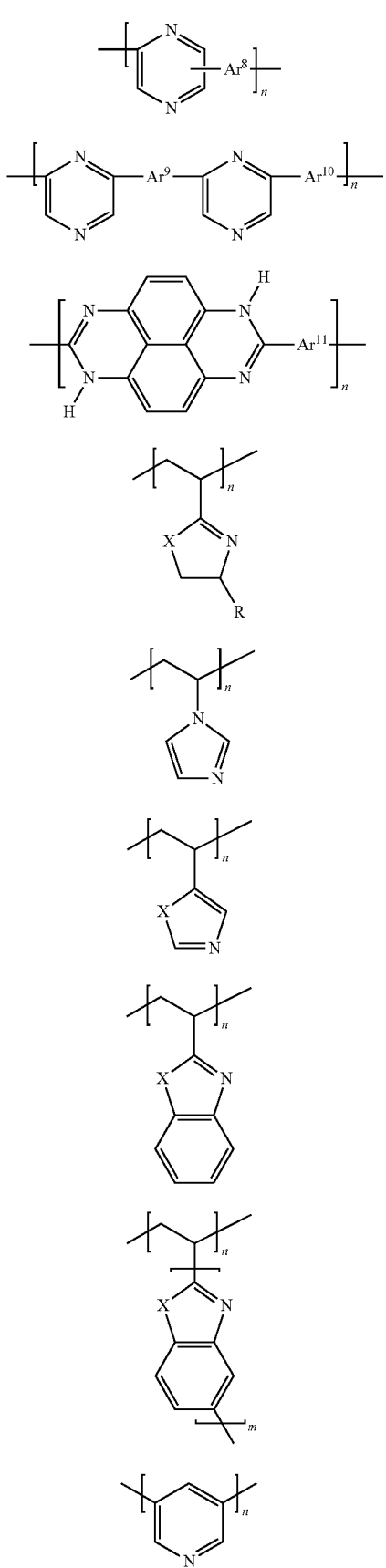
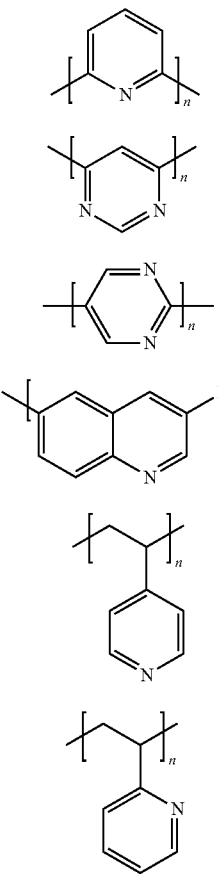

where
the radicals Ar are identical or different and are each a tetravalent aromatic or heteroaromatic group which may have one or more rings,
the radicals $Ar^1$ are identical or different and are each a divalent aromatic or hetero-aromatic group which may have one or more rings,
the radicals $Ar^2$ are identical or different and are each a divalent or trivalent aromatic or heteroaromatic group which may have one or more rings,
the radicals $Ar^3$ are identical or different and are each a trivalent aromatic or hetero-aromatic group which may have one or more rings,
the radicals $Ar^4$ are identical or different and are each a trivalent aromatic or hetero-aromatic group which may have one or more rings,
the radicals $Ar^5$ are identical or different and are each a tetravalent aromatic or hetero-aromatic group which may have one or more rings,
the radicals $Ar^6$ are identical or different and are each a divalent aromatic or hetero-aromatic group which may have one or more rings,
the radicals $Ar^7$ are identical or different and are each a divalent aromatic or hetero-aromatic group which may have one or more rings,
the radicals $Ar^8$ are identical or different and are each a trivalent aromatic or hetero-aromatic group which may have one or more rings,
the radicals $Ar^9$ are identical or different and are each a divalent or trivalent or tetravalent aromatic or heteroaromatic group which may have one or more rings, the radicals Ar¹⁰ are identical or different and are each a divalent or triavalent aromatic or heteroaromatic group which may have one or more rings, the radicals Ar¹¹ are identical or different and are each a divalent aromatic or hetero-aromatic group which may have one or more rings, the radicals X are identical or different and are each oxygen, sulfur or an amino group which bears a hydrogen atom, a group having from 1 to 20 carbon atoms, preferably a branched or unbranched alkyl or alkoxy group or an aryl group as further radical, the radicals R are identical or different and are each hydrogen, an alkyl group or an aromatic group and in formula (XX) an alkylene group or an aromatic group, with the proviso that R in formula (XX) is not hydrogen, and n, m are each an integer ≥10, preferably ≥100.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrole, pyrazole, anthracene, benzopyrrole, benzotriazole, benzooxathiadiazole, benzooxadiazole, benzopyridine, benzopyrazine, benzopyrazidine, benzopyrimidine, benzotriazine, indolizine, quinolizine, pyridopyridine, imidazolepyrimidine, pyrazinopyrimidine, carbazole, azeridine, phenazine, benzoquinoline, phenoxazine, phenothiazine, aziridizine, benzopteridine, phenanthroline and phenanthrene, which may optionally also be substituted.

Here, Ar¹, Ar⁴, Ar⁶, Ar⁷, Ar⁸, Ar⁹, Ar¹⁰ and Ar¹¹ can have any substitution pattern; in the case of phenylene, for example, Ar¹, Ar⁴, Ar⁶, Ar⁷, Ar⁸, Ar⁹, Ar¹⁰ and Ar¹¹ can each be, independently of one another, ortho-, meta- or para-phenylene. Particularly preferred groups are derived from benzene and biphenyls, which may optionally be substituted.

Preferred alkyl groups are alkyl groups having from 1 to 4 carbon atoms, e.g. methyl, ethyl, n-propyl, i-propyl and t-butyl groups.

Preferred aromatic groups are phenyl or naphthyl groups. The alkyl groups and the aromatic groups can be monosubstituted or polysubstituted.

Preferred substituents are halogen atoms, e.g. fluorine, amino groups, hydroxy groups or $C_1$-$C_4$-alkyl groups, e.g. methyl or ethyl groups.

The polyazoles can in principle have different recurring units which differ, for example, in their radical X. However, the respective polyazoles preferably have exclusively identical radicals X in a recurring unit.

In a particularly preferred embodiment of the present invention, the polyazole salt is based on a polyazole comprising recurring azole units of the formula (I) and/or (II).

The polyazoles used to form the polyazole salts are, in one embodiment, polyazoles comprising recurring azole units in the form of a copolymer or a blend which comprises at least two units of the formulae (I) to (XXII) which differ from one another. The polymers can be present as block copolymers (diblock, triblock), random copolymers, periodic copolymers and/or alternating polymers.

The number of recurring azole units in the polymer is preferably an integer ≥10, particularly preferably ≥100.

In a further preferred embodiment, the polyazoles used to form the polyazole salt are polyazoles comprising recurring units of the formula (I) in which the radicals X within the recurring units are identical.

Further preferred polyazoles on which the polyazole salts of the present invention are based are selected from the group consisting of polybenzimidazole, poly(pyridine), poly(pyrimidine), polyimidazole, polybenzothiazole, polybenzoxazole, polyoxadiazole, polyquinoxaline, polythiadiazole and poly(tetrazapyrene).

In a particularly preferred embodiment, the polyazole salt is based on a polyazole comprising recurring benzimidazole units. Suitable polyazoles which have recurring benzimidazole units are indicated below:

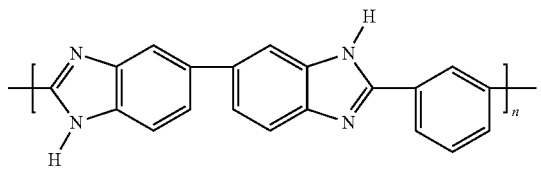
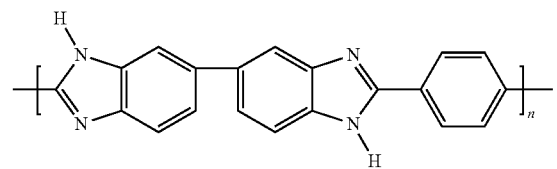

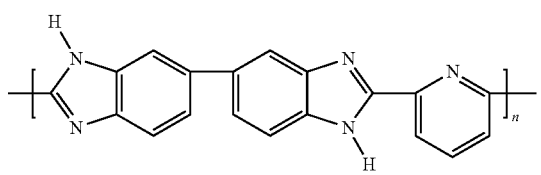
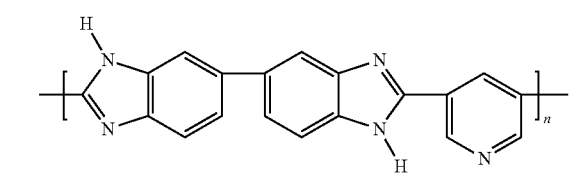

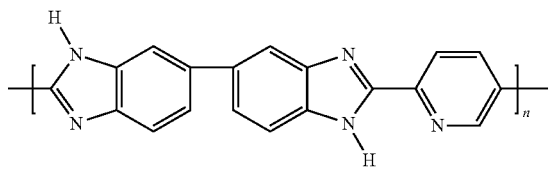
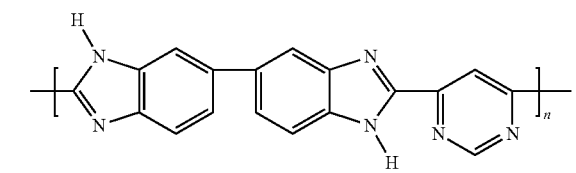

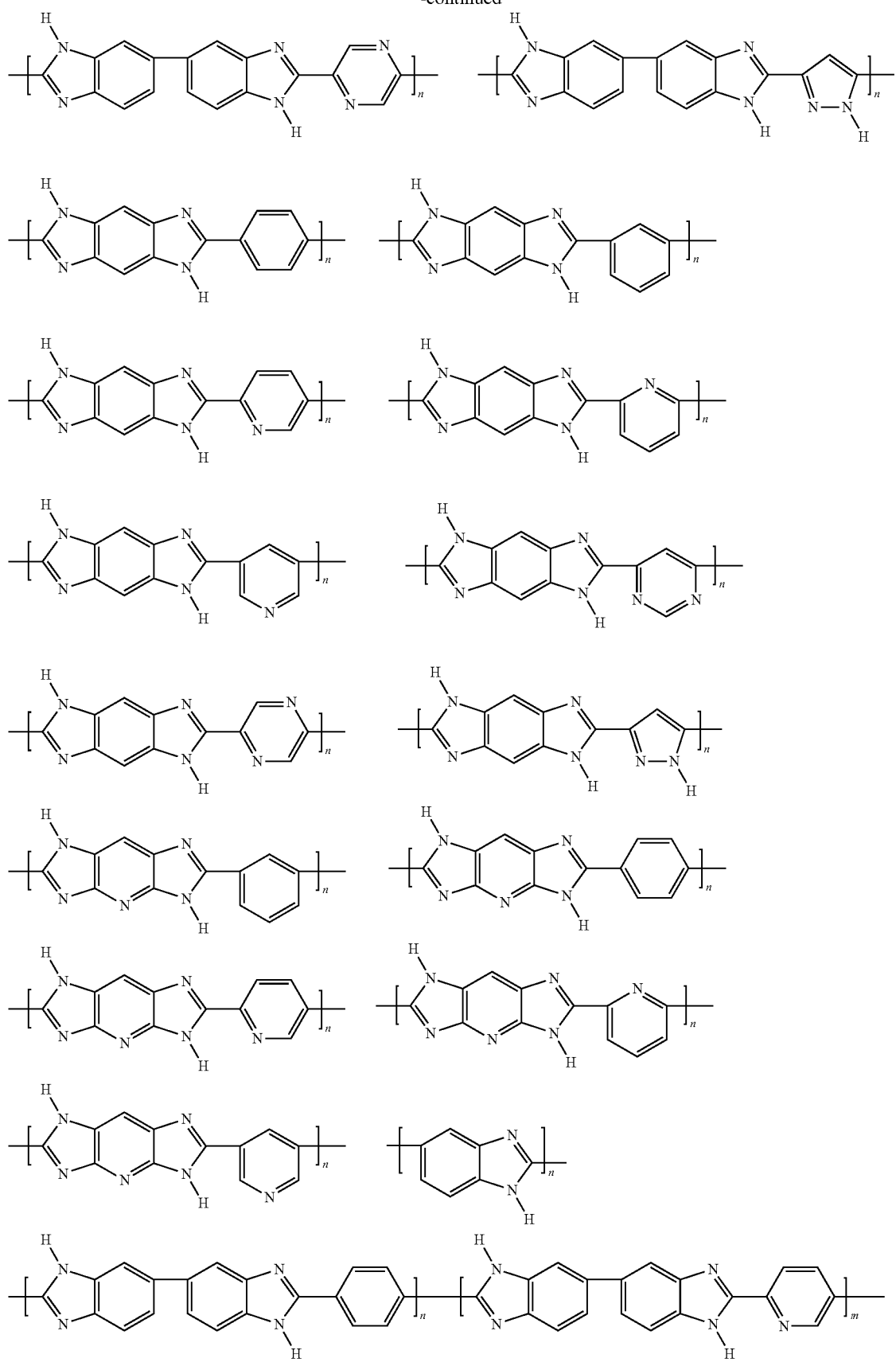

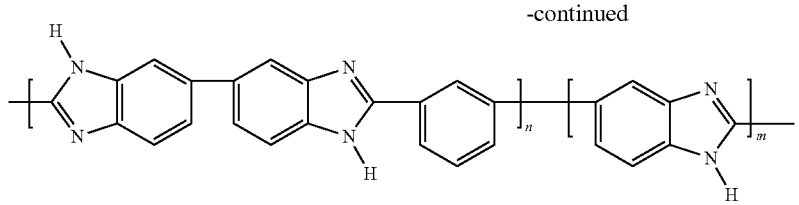

where n and m are integers ≥10, preferably ≥100.

The polyazole on which the polyazole salt used according to the invention is based particularly preferably has repeating units of the following formula

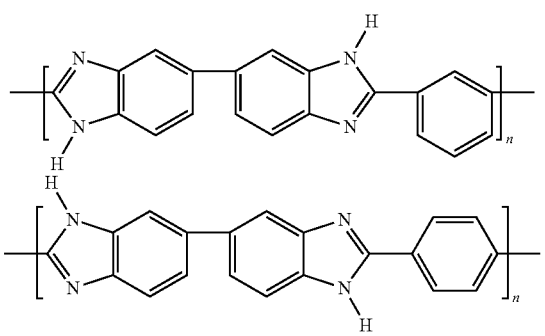

where n is an integer ≥10, preferably ≥100.

The polyazoles on which the polyazole salt used according to the invention is based, preferably the polybenzimidazoles, have a high molecular weight. Measured as intrinsic viscosity, the molecular weight is at least 0.2 dl/g, preferably from 0.8 to 10 dl/g, particularly preferably from 1 to 10 dl/g. The viscosity eta i, also referred to as intrinsic viscosity, is calculated from the relative viscosity eta rel according to the following equation: eta i=(2.303×log eta rel)/concentration. The concentration is reported in g/100 ml. The relative viscosity of the polyazoles is determined by means of a capillary viscometer from the viscosity of the solution at 25° C., with the relative viscosity being calculated from the corrected running-out times for solvent t0 and solution t1 according to the following equation: eta rel=t1/t0. The conversion to eta i is carried out according to the above relationship on the basis of the information in "Methods in Carbohydrate Chemistry", Volume IV, Starch, Academic Press, New York and London, 1964, page 127.

Preferred polybenzimidazoles are commercially available under, for example, the trade name Celazole® PBI (PBI Performance Products Inc.).

In a preferred embodiment of the present invention, the proton-conducting polymer electrolyte membranes according to the present invention have reinforcing elements. These reinforcing elements generally at least partly penetrate through the polymer electrolyte membrane, i.e. the reinforcing elements generally penetrate at least partly into the polymer electrolyte membrane. The reinforcing elements are particularly preferably predominantly embedded in the membrane and project, if at all, therefrom only in places.

According to the present invention, the reinforcing elements are at least partly joined to the membrane. A partial composite is considered to be a composite of reinforcing element and membrane in which the reinforcing elements advantageously take up such a force that in the force-elongation curve at 20° C., the reference force of the polymer electrolyte membrane having reinforcing elements compared to the polymer electrolyte membrane without reinforcing elements in the range from 0 to 1% elongation differs at at least one point by at least 10%, preferably by at least 20% and very particularly preferably by at least 30%.

The polymer electrolyte membrane having reinforcing elements is preferably fiber-reinforced. Here, use is generally made of reinforcing elements which preferably comprise monofilaments, multifilaments, long and/or short fibers, hybrid yarns and/or bicomponent fibers. Apart from a reinforcing element comprising specific fibers, the reinforcing element can also form a textile sheet. Suitable textile sheets are nonwovens, woven fabrics, drawn-loop knits, formed-loop knits, felts, lay-ups and/or meshes, particularly preferably lay-ups, woven fabrics and/or nonwovens. Nonlimiting examples of the abovementioned woven fabrics are fabrics composed of polyphenylene sulfone, polyether sulfone, polyether ketone, polyether ether ketone, poly(acrylic), poly(ethylene terephthalate), poly(propylene), poly(tetrafluoroethylene), poly(ethylene-co-tetrafluoroethylene) (ETFE), 1:1 alternating copolymer of ethylene and chlorotrifluoroethylene (ECTFE), polyvinylidene fluoride (PVDF), poly(acrylonitrile) and polyphenylene sulfide (PPS).

The term woven fabrics refers to products composed of monofilament threads and/or multifilament threads which cross predominantly at right angles. The thread-to-thread distance of the textile sheets can usually be from 20 to 2000 μm; for the purposes of the present invention, textile sheets, in particular woven fabrics, lay-ups and meshes, having a thread-to-thread distance in the range from 30 to 300 μm have been found to be particularly useful. Here, the thread-to-thread distance can be determined, for example, by electronic image analysis of an optical photograph or transmission electron micrograph.

Further details regarding suitable woven fabrics, lay-ups and meshes are disclosed in DE 10 2006 036019 A1.

Particularly preferably suitable woven fabrics are, for example, woven fabrics from SEFAR having the trade names SEFAR NITEX®, SEFAR PETEX®, SEFAR PROPYLTEX®, SEFAR FLUORTEX® and SEFAR PEAKTEX®, woven fabrics from SAATI having the trade name Saati 90.30 and woven fabrics from DEXMET having the trade names Dexmet 2PTFE10-105, Dexmet 2PTFE5-105H and Dexmet 2PTFE2-50H.

The term nonwovens refers to flexible, porous sheet-like structures which are not produced by classical methods of warp and weft weaving and by stitch formation, but rather by entanglement and/or cohesive and/or adhesive joining of fibers (e.g. spunbond or melt blown nonwovens). Nonwovens are loose materials made up of spinning fibers or filaments whose cohesion is generally produced by the intrinsic adhesion of the fibers or by means of mechanical after-consolidation.

According to the present invention, the individual fibers can have a preferential direction (oriented or cross nonwovens) or be unaligned (random nonwovens). The nonwovens can be mechanically strengthened by needling, intermeshing or by interlacing by means of strong water jets (known as spunlaced nonwovens).

Further properties of suitable nonwovens may be found in DE 10 2006 036019 A1.

Suitable examples of preferred nonwovens are SEFAR PETEX®, SEFAR FLUOROTEX® and SEFAR PEEK-TEX®.

In addition, the composition of the reinforcing elements can be chosen freely and matched to the specific application. However, the reinforcing elements preferably comprise glass fibers, mineral fibers, natural fibers, carbon fibers, boron fibers, synthetic fibers, polymer fibers and/or ceramic fibers, in particular SEFAR CARBOTEX®, SEFAR PETEX®, SEFAR FLUORTEX®, SEFAR PEEKTEX®, SEFAR TETEX MONO®, SEFAR TETEX DLW®, SEFAR TETEX MULTI from SEFAR and also DUOFIL®, EMMITEX GARN®. Square-weave braids, braids, twilled braids or multiplex weaves from GDK are likewise suitable.

It is in principle possible to use all types of materials as long as they are largely inert and meet the mechanical requirements for the reinforcement under the conditions prevailing during operation of the fuel cell.

The reinforcing elements, which are optionally constituent of a woven fabric, drawn-loop knit, formed-loop knit or nonwoven, can have a virtually round cross section or else other shapes such as dumbbell-shaped, kidney-shaped, triangular or multilobal cross sections. Bicomponent fibers are also possible.

The reinforcing elements preferably have a maximum diameter of from 10 µm to 500 µm, particularly preferably from 20 µm to 300 µm, very particularly preferably from 20 µm to 200 µm and in particular from 25 µm to 100 µm. Here, the maximum diameter refers to the longest dimension in the cross section.

Furthermore, the reinforcing elements preferably have a Young's modulus of at least 5 GPa, preferably at least 10 GPa, particularly preferably at least 20 GPa. The elongation at break of the reinforcing elements is preferably from 0.5% to 300%, particularly preferably from 1% to 60%.

The proportion by volume of the reinforcing elements, based on the total volume of the polymer electrolyte membrane, is preferably from 5% by volume to 95% by volume, particularly preferably from 10% by volume to 80% by volume, very particularly preferably from 10% by volume to 50% by volume and in particular from 10% by volume to 30% by volume. The proportion by volume is usually measured at 20° C.

For the purposes of the present invention, the reinforcing elements usually take up such a force that in the force-elongation curve at 20° C., the reference force of the polymer electrolyte membrane having reinforcing elements compared to the polymer electrolyte membrane without reinforcing elements in the range from 0 to 1% elongation at least one point differs by at least 10%, preferably by at least 20%, particularly preferably by at least 30%.

In addition, the reinforcement is advantageously such that the reference force of the polymer electrolyte membrane at room temperature (20° C.) divided by the reference force of the support insert at 180° C., measured at least one point in the range from 0 to 1% elongation, gives a quotient of not more than 3, preferably not more than 2.5, particularly preferably <2.

The measurement of the reference force is carried out in accordance with EN29073, Part 3, on 5 cm wide specimens at a measurement length of 100 mm. The numerical value of the prestressing force, reported in centinewton [cN] corresponds to the numerical value of the mass per unit area of the specimen, reported in gram per m$^2$.

The polymer electrolyte membranes can be produced by methods known to those skilled in the art, and may, in one embodiment of the present invention, be provided with reinforcing elements directly during production of the membranes.

The polymer electrolyte membranes of the present invention can usually be produced by firstly dissolving at least one polyazole in at least one polar, aprotic solvent, for example dimethylacetamide (DMAc), and producing a polymer film (polymer membrane) by means of a classical process. In this case, the reinforcing elements which may optionally be present can, for example, be introduced into the film during production of the film. To remove solvent residues, the film obtained in this way can be treated with a washing liquid, for example as described in DE 10109829. The freeing of the polyazole film of solvent residues as described in DE 10109829 improves the mechanical properties of the film compared to films which have not been freed of solvent residues in this way.

In addition, the polymer film can have further modifications, for example by crosslinking, as described in DE 10110752 and WO 00/44816.

The thickness of the polyazole films (polyazole membranes) can be within a wide range. The polyazole films before doping with acid as described below preferably have a thickness of generally from 5 µm to 2000 µm, preferably from 10 µm to 1000 µm, particularly preferably from 20 µm to 1000 µm.

To obtain proton conductivity, the abovementioned films are doped with an acid. Suitable acids (electrolytes) have been mentioned above. Particular preference is given to using phosphoric acid ($H_3PO_4$) as acid.

To obtain improved membrane stability of the proton-conducting polymer electrolyte membranes of the present invention in the acids used as electrolyte, particularly preferably phosphoric acid, polyazole salts of an organic or inorganic acid which are such that the polyazole salt of the organic or inorganic acid has a lower solubility in the acid used as electrolyte than the polyazole salt of the acid used as electrolyte are, according to the invention, used in the polymer electrolyte membranes. These polyazole salts are, according to the invention, obtained by treating the abovementioned polymer films which have been doped with the acid used as electrolyte, particularly preferably phosphoric acid, with at least one of the above-mentioned inorganic or organic acids. This can be effected by firstly washing the abovementioned polymer films (polymer membranes) doped with the acid used as electrolyte, particularly preferably phosphoric acid, with water until neutral and subsequently doping them with at least one organic or inorganic acid whose polyazole salt has a lower solubility in the acid used as electrolyte than the polyazole salt of the acid used as electrolyte, in water or in phosphoric acid. However, it is also possible for the abovementioned polymer films (polymer membranes) doped with the acid used as electrolyte, particularly preferably phosphoric acid, to be treated directly with the inorganic or organic acid.

The polymer membranes based on polyazole salts which have been obtained in this way dissolve to a significantly lesser extent in the acid used as electrolyte, particularly preferably phosphoric acid, than do corresponding polyazole membranes which are not based on the polyazole salts mentioned.

The treatment of the abovementioned polymer films (polymer membranes) doped with the acid used as electrolyte, particularly preferably phosphoric acid, with the at least one inorganic or organic acid is, as mentioned above, generally carried out in water or in phosphoric acid. The treatment is usually carried out at room temperature. In general, the amount of inorganic or organic acid corresponds to at least the stoichiometric amount necessary to form the polyazole salts from the corresponding polyazoles. The organic or inorganic acid can also be used in excess.

In a preferred embodiment, the proton-conducting polymer electrolyte membranes of the present invention are obtained by a process which comprises the following steps:
ia) dissolution of at least one polyazole in phosphoric acid,
iia) heating of the solution which can be obtained as per step
 i) under inert gas to temperatures of up to 400° C., preferably from 100 to 250° C.,
iiia) provision of a support and optionally arrangement of reinforcing elements on the support,
iva) formation of a membrane using the solution of the polymer as per step ii) on the support from step iii),
va) treatment of the membrane formed in step iva) until it is self-supporting,
via) optionally washing of the membrane obtained in step va) with water until the membrane is neutral,
viia) treatment of the membrane obtained in step va) or in step via) with an organic or inorganic acid which has a lower $pK_a$ than phosphoric acid in water,
viiia) mixing of the membrane obtained in step viia) with phosphoric acid.

Steps ia), iia), iva) and va) have been described comprehensively in DE 10246461. This application is hereby incorporated by reference.

Further processes for producing proton-conducting polymer electrolyte membranes based on polyazoles are described in DE 10 2006 036019 A1. To obtain the polymer electrolyte membranes according to the invention based on polyazole salts, the polymer electrolyte membranes obtained by the processes described in DE 10 2006 036019 A1 can be treated in accordance with steps via), viia) and viiia).

The addition of reinforcing elements as described in DE 10 2006 036019 A1 is optional.

The abovementioned steps via), viia) and viiia) are generally carried out at room temperature. Conventional deionized water is generally used as water in step via). Suitable organic or inorganic acids which can be used in step viia) are the acids mentioned above in the present patent application.

The mixing of the membrane obtained in step viia) with phosphoric acid in step viiia) is carried out in order to provide phosphoric acid as electrolyte, with the phosphoric acid being used in an amount of generally from 30 to 99% by weight, preferably from 40 to 90% by weight, particularly preferably from 40 to 85% by weight, based on the amount of polymer electrolyte membrane obtained in step viia).

The present invention further provides a membrane-electrode assembly comprising at least two electrochemically active electrodes which are separated by a polymer electrolyte membrane, wherein the polymer electrolyte membrane is a proton-conducting polymer electrolyte membrane according to the present invention or produced according to the present invention.

The at least two electrochemically active electrodes are usually anode and cathode. The term "electrochemically active" indicates that the electrodes are able to catalyze the oxidation of hydrogen and/or at least one reformate and the reduction of oxygen. This property can be obtained by coating the electrodes with noble metals. Suitable noble metals are mentioned below. The term "electrode" means that the material is electrically conductive. The electrode can optionally have a layer of noble metal. Such electrodes are known and are described, for example, in U.S. Pat. No. 4,191,618, U.S. Pat. No. 4,212,714 and U.S. Pat. No. 4,333,805.

The electrodes preferably comprise gas diffusion layers which are in contact with a catalyst layer.

Sheet-like, electrically conductive and acid-resistant structures are usually used as gas diffusion layers. These include, for example, graphite fiber papers, carbon fiber papers, woven graphite fabrics and/or papers which have been made conductive by addition of carbon black. Fine dispersion of the gas and/or liquid streams is achieved by means of these layers.

Furthermore, it is also possible to use gas diffusion layers which comprise a mechanically stable support material which is impregnated with at least one electrically conductive material such as carbon (for example carbon black). Support materials which are particularly suitable for these purposes comprise fibers, for example in the form of nonwovens, papers or woven fabrics, in particular carbon fibers, glass fibers or fibers comprising organic polymers, for example polypropylene, polyesters (in particular polyethylene terephthalate, polyphenylene sulfide or polyether ketones). Further details regarding such diffusion layers may be found, for example, in WO 97/20358.

The gas diffusion layers preferably have a thickness of from 80 μm to 2000 μm, particularly preferably from 100 μm to 1000 μm, very particularly preferably from 150 μm to 500 μm.

Furthermore, the gas diffusion layers preferably have a high porosity. This is usually in the range from 20% to 80%.

The gas diffusion layers can comprise customary additives. These include, inter alia, fluoropolymers, e.g. polytetrafluoroethylene (PTFE) and surface-active substances.

In a preferred embodiment, at least one of the gas diffusion layers can comprise a compressible material. According to the present invention, a compressible material has the property that the gas diffusion layer can be pressed to half, in particular a third, of its original thickness without loss of integrity.

This property is generally displayed by gas diffusion layers composed of woven graphite fabrics and/or paper which has been made conductive by addition of carbon black.

The catalytically active layer comprises at least one catalytically active substance. Such substances include, inter alia, noble metals, preferably platinum, palladium, rhodium, iridium and/or ruthenium. These substances can also be used in the form of alloys with one another. Furthermore, these substances can also be used in alloys with base metals, for example Cr, Zr, Ni, Co and/or Ti. In addition, the oxides of the above-mentioned noble metals and/or base metals can also be used. The above-mentioned metals are usually used after application by known methods to a support material, usually carbon having a high specific surface area in the form of nanoparticles.

The catalytically active compounds, i.e. the catalysts, are preferably used in the form of particles which particularly preferably have a size of from 1 to 1000 nm, preferably from 5 to 200 nm, particularly preferably from 10 to 100 nm, with the size being the particle diameter. The weight ratio of the polyazole salt present in the proton-conducting polymer electrolyte membrane of the present invention to catalyst material comprising at least one noble metal and optionally one or more support materials is generally greater than 0.05, preferably in the range from 0.1 to 0.6.

The thickness of the catalyst layer is generally from 1 to 1000 μm, preferably from 5 to 500 μm, particularly preferably from 10 to 300 μm. This value represents an average which can be determined by measuring the layer thickness in cross section in images recorded by means of a scanning electron microscope (SEM).

The noble metal content of the catalyst layer is generally from 0.1 to 10 mg/cm$^2$, preferably from 0.2 to 6.0 mg/cm$^2$, particularly preferably from 0.2 to 3.0 mg/cm$^2$. These values can be determined by elemental analysis of a sheet specimen.

The catalyst layer is generally not self-supporting but is instead usually applied to the gas diffusion layer and/or the membrane. Here, part of the catalyst layer can, for example, diffuse into the gas diffusion layer and/or the membrane, as a result of which transition layers are formed. This can also lead to the catalyst layer being considered to be part of the gas diffusion layer.

In general, the surfaces of the polymer electrolyte membrane are in contact with the electrodes in such a way that the first electrode covers the front side of the polymer electrolyte membrane and the second electrode covers the rear side of the polymer electrolyte membrane in each case partly or completely, preferably only partly. Here, the front and rear sides of the polymer electrolyte membrane are the side of the polymer electrolyte membrane facing or facing away from, respectively, the viewer, with the view being from the first electrode (front), preferably the cathode, in the direction of the second electrode (rear), preferably the anode.

Further information regarding the properties of polymer electrolyte membranes and of electrodes are summarized, for example, in WO 01/188494 A2, DE 19509748, DE 19509749, WO 00/26982, WO 92/15121 and DE 19757492.

The production of the membrane-electrode assembly of the invention is known to those skilled in the art. In general, the various constituents of the membrane-electrode assembly are laid on top of one another and joined to one another by means of pressure and heat, with lamination usually being carried out at a temperature of from 10 to 300° C., preferably from 20 to 200° C., and a pressure of generally from 1 to 1000 bar, preferably from 3 to 300 bar.

The membrane-electrode assemblies of the invention have a significantly improved mechanical stability and strength and can therefore be used for producing fuel cells and fuel cell stacks having particularly high performance. Here, only small power fluctuations of the resulting fuel cells or fuel cell stacks occur and high quality, reliability and reproducibility are achieved. This is also achieved as a result of the proton-conducting membranes of the invention which are based on the above-mentioned polyazole salts being used.

Owing to their dimensional stability in the case of fluctuating ambient temperatures and atmospheric humidity, the membrane-electrode assemblies of the invention can be stored and transported without problems. Even after prolonged storage or after transport to places having significantly different climatic conditions, the dimensions of the membrane-electrode assemblies remain accurate for installation without problems in fuel cells or fuel cell stacks. The membrane-electrode assembly then no longer has to be conditioned on site for outdoor installation, which simplifies production of the fuel cells and saves time and money.

An advantage of the preferred membrane-electrode assemblies according to the present invention is that they make it possible for the fuel cell to be operated at temperatures above 120° C. This applies in the case of gaseous and liquid fuels, e.g. hydrogen-comprising gases, which are produced, for example, from hydrocarbons in a preceding reforming step. As oxidant, it is possible to use, for example, oxygen or air.

A further advantage of the preferred membrane-electrode assemblies of the present invention is that they have a high tolerance to carbon monoxide in operation above 120° C. even with pure platinum catalysts, i.e. without a further alloying constituent. At temperatures of 160° C., it is possible, for example, for more than 1% of CO to be present in the fuel gas without this leading to an appreciable reduction in the performance of the fuel cell.

Preferred membrane-electrode assemblies can be operated in fuel cells without the fuel gases and the oxidants having to be humidified, despite the possible high operating temperatures. The fuel cell nevertheless operates stably and the membrane does not lose its conductivity. This simplifies the overall fuel cell system and brings additional cost savings since operation of the water circuit is simplified. Furthermore, the behavior of the fuel cell system at temperatures below 0° C. is also simplified thereby.

Preferred membrane-electrode assemblies also allow the fuel cell to be cooled to room temperature and below without problems and then be taken into operation again without a drop in performance.

Furthermore, the membrane-electrode assemblies of the present invention display a very high long-term stability. This makes it possible to provide fuel cells which likewise have a high long-term stability. Furthermore, the membrane-electrode assemblies of the invention have excellent heat and corrosion resistance and a comparatively low gas permeability, in particular at high temperatures. A decrease in the mechanical stability and the structural integrity, in particular at high temperatures, is reduced or avoided in the membrane-electrode assemblies of the invention.

In addition, the membrane-electrode assemblies of the invention can be produced inexpensively and simply.

The present invention further provides a fuel cell comprising at least one membrane-electrode assembly according to the present invention. Suitable fuel cells and the components thereof are known to those skilled in the art.

Since the power of a single fuel cell is often too low for many applications, preference is given, for the purposes of the present invention, to combining a plurality of single fuel cells via separator plates to form a fuel cell stack. The separator plates should, optionally in combination with further sealing materials, seal the gas spaces of the cathode and the anode from the outside and from one another. For this purpose, the separator plates are preferably juxtaposed in a sealing fashion with the membrane-electrode assembly. The sealing effect can be increased further by pressing the composite of separator plates and membrane-electrode assembly.

The separator plates preferably each have at least one gas channel for reaction gases, which are advantageously arranged on the sides facing the electrodes. The gas channels should make dispersion of the reactant fluids possible.

Owing to the high long-term stability of the membrane-electrode assemblies of the present invention, the fuel cell of the invention also has a high long-term stability. The fuel cell of the invention can usually be operated continuously at temperatures of more than 120° C. using dry reaction gases for long periods, e.g. more than 5000 hours, without an appreciable degradation in performance being observed. The power densities which can be achieved are still high after such a long time.

The fuel cells of the invention display a high open-circuit voltage even after a long time, for example more than 5000 hours; the open-circuit voltage is preferably at least 900 mV after this time. To measure the open-circuit voltage, the fuel cell is operated without current with water being supplied to the anode and air being supplied to the cathode. The measurement is carried out by switching the fuel cell from a current of 0.2 A/cm$^2$ to the zero-current state and then recording the open-circuit voltage for five minutes. The value after five minutes is the respective open-circuit potential. The measured values of the open-circuit voltage are at a temperature of 160° C. In addition, the fuel cell preferably displays a low gas crossover after this time. To measure the crossover, the anode side of the fuel cell is operated using hydrogen (5 l/h), and the cathode is operated using nitrogen (5 l/h). The anode serves as reference electrode and counterelectrode, and the cathode serves as working electrode. The cathode is set to a potential of 0.5 V and the hydrogen diffusing through the membrane is oxidized at the cathode in a mass transfer-limited manner. The resulting current is a measure of the hydrogen permeation rate. The current is <3 mA/cm$^2$, preferably <2 mA/cm$^2$, particularly preferably <1 mA/cm$^2$, in a 50 cm$^2$ cell. The measured values of the H$_2$ crossover are at a temperature of 160° C.

The present invention further provides for the use of the proton-conducting polymer electrolyte membrane of the invention comprising phosphoric acid as electrolyte in a membrane-electrode assembly and also the use of the proton-conducting polymer electrolyte membrane of the invention in a fuel cell.

Suitable polymer electrolyte membranes, membrane-electrode assemblies and fuel cells have been mentioned above.

The following examples illustrate the invention.

EXAMPLES

To check the solubility of the proton-conducting polymer electrolyte membrane of the invention based on a polyazole salt in phosphoric acid, solubility tests are carried out on the respective membrane in phosphoric acid (examples according to the invention), and the solubility is compared with the solubility of polyazole-based polymer electrolyte membranes known from the prior art (comparative experiment).

Example 1

Production of a Polymer Electrolyte Membrane Based on a Polyazole Salt of Pentafluorophenol, with Doping being Carried Out in Water The membrane produced as described in DE 10 2006 036019 A1 is washed thoroughly with deionized water. The membrane is then laid, without drying, 3 times in a 0.1 M solution of pentafluorophenol in water. The membrane is subsequently doped with 85% strength H$_3$PO$_4$. FIG. 1 shows the solubility of the membrane of Example 1. Here, the dark spots in the figures are the remaining membrane which has not dissolved in 99% phosphoric acid.

Example 2

Figure 2:
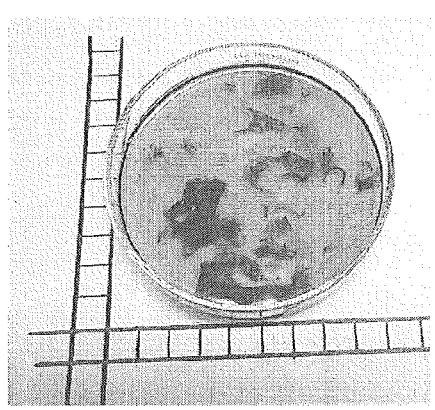

Production of a Polymer Electrolyte Membrane Based on a Polyazole Salt of Pentafluorophenol Produced in Phosphoric Acid The membrane produced as described in DE 10 2006 036019 A1 is washed thoroughly with deionized water. The membrane is then laid, without drying, 3 times in a 0.2 M solution of pentafluorophenol in H$_3$PO$_4$ (85%). The membrane is subsequently doped with 85% strength H$_3$PO$_4$. FIG. 2 shows the solubility of the membrane of Example 2. Here, the dark spots in the figures are the remaining membrane which has not dissolved in 99% phosphoric acid.

Example 3

Comparative Example

Figure 3:
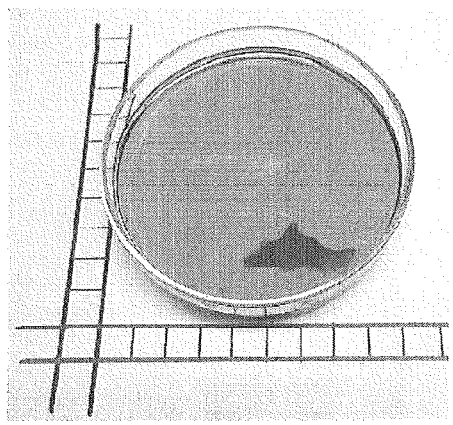

A commercially available Celtec-P membrane (produced as described in DE 10 2006 036019 A1) is used as comparative membrane and is heated for three hours at 230° C. in 120 g of 99% strength phosphoric acid [5×5 cm]. FIG. 3 shows the solubility of the membrane of Example 3. Here, the dark spots in the figures are the remaining membrane which has not dissolved in 99% phosphoric acid.

FIGS. 1, 2 and 3 show the solubility of the membranes from Examples 1, 2 and 3. Here, the dark spots in the figures are the remaining membrane which has not dissolved in 99% phosphoric acid.

It can clearly be seen from the figures that the polymer electrolyte membranes according to the invention based on polyazole salts with pentafluorophenol have a significantly lower solubility in phosphoric acid that do the membranes known from the prior art.

Figure 4:
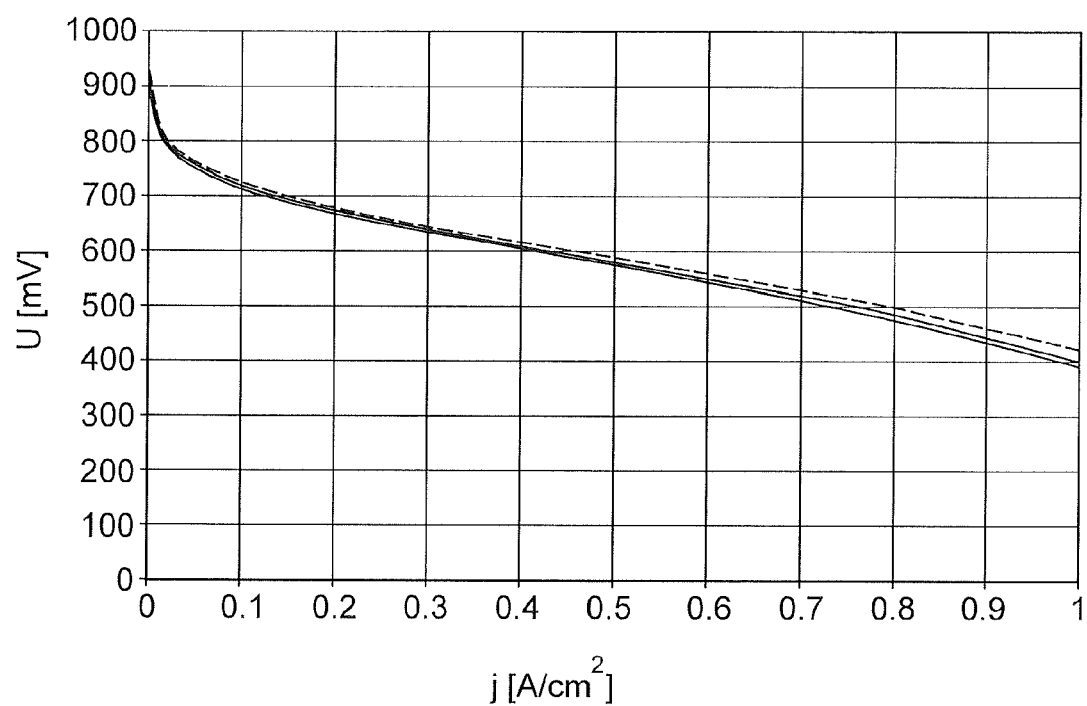
FIG. 4 shows the power achieved by membranes from Examples 1, 2 and 3 in a current-voltage curve.

FIG. 4 shows the power achieved by the three abovementioned membranes from Examples 1, 2 and 3 in a current-voltage curve.

The voltage in mV is shown on the y axis and the current density in A/cm$^2$ is shown on the x axis.

The power is measured in a fuel cell (H$_2$/air) at temperatures of 160° C., with the anode being coated with one mg of platinum per cm$^2$ and the cathode being coated with 1 mg of platinum and nickel per cm$^2$.

In FIG. 4, the diamonds represent the power of a membrane as per Comparative Example 3, the triangles represent the power of a membrane as per Example 2 according to the invention and the solid line represents the power achieved by a membrane as per Example 1 according to the invention.

It is clear from FIG. 4 that the power is not adversely affected by the use of a polyazole salt which has a lower solubility in the acid used as electrolyte than does the polyazole salt of the acid used as electrolyte.

The invention claimed is:

1. A proton-conducting polymer electrolyte membrane which comprises a polyazole salt made from a polyazole and an organic or inorganic acid wherein the polyazole salt is doped with an acid as electrolyte, with the polyazole salt of the organic or inorganic acid having a lower solubility in the acid used as electrolyte than the polyazole salt of the acid used as electrolyte, wherein the acid used as the electrolyte is phosphoric acid;

wherein the inorganic or organic acid or organic and inorganic acids is/are selected from the group consisting of perfluorinated phenols, perfluorinated phenyl alcohols, K$_2$SO$_4$, HNO$_3$, FSO$_3$H, HPO$_2$F$_2$, H$_2$SO$_3$, HOOC—COOH, sulfonic acids, perfluorinated sulfonic acids, perfluorosulfonamides, perfluorophosphonic acids and perfluoroalkylcarboxylic acids.

2. The proton-conducting polymer electrolyte membrane according to claim 1, wherein the inorganic or organic acid is selected from the group consisting of pentafluorophenol, CH$_3$SO$_3$H, CF$_3$SO$_3$H, CF$_3$CF$_2$SO$_3$H, (CF$_3$)$_2$SO$_2$NH, (CF$_3$CF$_2$)$_2$SO$_2$NH, (CF$_3$CF$_2$CF$_2$)$_2$SO$_2$NH, CF$_3$PO$_3$H$_2$, CF$_3$CF$_2$PO$_3$H$_2$ and CF$_3$CF$_2$CF$_2$PO$_3$H$_2$.

3. The proton-conducting polymer electrolyte membrane according to claim 1, wherein the polyazole salt is based on a polyazole comprising recurring azole units of the general formula (1) and/or (II)

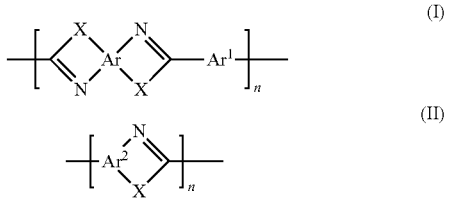

where
the radicals Ar are identical or different and are each a tetravalent aromatic or heteroaromatic group which may have one or more rings,
the radicals $Ar^1$ are identical or different and are each a divalent aromatic or hetero-aromatic group which may have one or more rings,
the radicals $Ar^2$ are identical or different and are each a divalent or trivalent aromatic or heteroaromatic group which may have one or more rings,
the radicals X are identical or different and are each oxygen, sulfur or an amino group which bears a hydrogen atom, a group having from 1 to 20 carbon atoms, and
n is an integer greater than or equal to 10.

4. The proton-conducting polymer electrolyte membrane according to claim 3, wherein the radicals X are identical or different and are each oxygen, sulfur or an amino group which bears a hydrogen atom, a group having from 1 to 20 carbon atoms, wherein the group is a branched or unbranched alkyl or alkoxy group or an aryl group as further radical, and
n is an integer greater than or equal to 100.

5. The proton-conducting polymer electrolyte membrane as claimed in claim 1, comprising phosphoric acid as electrolyte, wherein the polyazole salt is based on a polyazole selected from the group consisting of polybenzimidazole, poly(pyridine), poly(pyrimidine), polyimidazole, polybenzothiazole, polybenzoxazole, polyoxadiazole, polyquinoxaline, polythiadiazole and poly(tetrazapyrene).

6. The proton-conducting polymer electrolyte membrane according to claim 5, wherein the polyazole has recurring benzimidazole units of one of the following formulae:

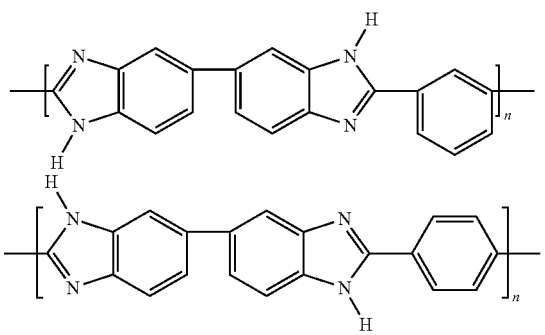

wherein n is an integer ≥10.

7. The proton-conducting polymer electrolyte membrane according to claim 6, wherein n is ≥100.

8. The proton-conducting polymer electrolyte membrane according to claim 1, wherein the polymer electrolyte membrane has reinforcing elements.

9. The proton-conducting polymer electrolyte membrane according to claim 8, wherein the polymer electrolyte membrane is fiber-reinforced.

10. The proton-conducting polymer electrolyte membrane according to claim 8, wherein the proportion by volume of the reinforcing elements, based on the total volume of the polymer electrolyte membrane, is from 5% by volume to 95% by volume.

11. A membrane-electrode assembly comprising at least two electrochemically active electrodes which are separated by a polymer electrolyte membrane, wherein the polymer electrolyte membrane is a proton-conducting polymer electrolyte membrane according to claim 1.

12. A fuel cell comprising at least one membrane-electrode assembly according to claim 11.

13. A proton-conducting polymer electrolyte membrane which comprises a polyazole salt made from a polyazole and an organic or inorganic acid wherein the polyazole salt is doped with an acid as electrolyte, with the polyazole salt of the organic or inorganic acid having a lower solubility in the acid used as electrolyte than the polyazole salt of the acid used as electrolyte, wherein the inorganic or organic acid or organic and inorganic acids is/are selected from the group consisting of perfluorinated phenols, perfluorinated phenyl alcohols, $K_2SO_4$, $HNO_3$, $FSO_3H$, $HPO_2F_2$, HOOC—COOH and perfluoroalkylcarboxylic acids.

14. The proton-conducting polymer electrolyte membrane according to claim 13, wherein the acid used as electrolyte is phosphoric acid.

15. The proton-conducting polymer electrolyte membrane according to claim 13, wherein the inorganic or organic acid is selected from the group consisting of pentafluorophenol, $CF_3PO_3H_2$, $CF_3CF_2PO_3H_2$ and $CF_3CF_2CF_2PO_3H_2$.

16. The proton-conducting polymer electrolyte membrane according to claim 13, wherein the polyazole salt is based on a polyazole comprising recurring azole units of the general formula (1) and/or (II)

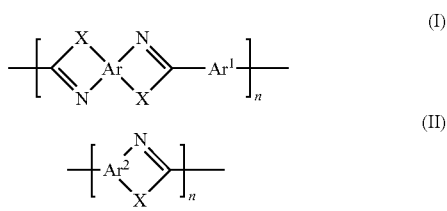

where
the radicals Ar are identical or different and are each a tetravalent aromatic or heteroaromatic group which may have one or more rings,
the radicals $Ar^1$ are identical or different and are each a divalent aromatic or hetero-aromatic group which may have one or more rings,
the radicals $Ar^2$ are identical or different and are each a divalent or trivalent aromatic or heteroaromatic group which may have one or more rings,
the radicals X are identical or different and are each oxygen, sulfur or an amino group which bears a hydrogen atom, a group having from 1 to 20 carbon atoms, and
n is an integer greater than or equal to 10.

17. The proton-conducting polymer electrolyte membrane according to claim 16, wherein the radicals X are identical or different and are each oxygen, sulfur or an amino group which bears a hydrogen atom, a group having from 1 to 20 carbon atoms, wherein the group is a branched or unbranched alkyl or alkoxy group or an aryl group as further radical, and n is an integer greater than or equal to 100.

18. The proton-conducting polymer electrolyte membrane as claimed in claim 13, comprising phosphoric acid as electrolyte, wherein the polyazole salt is based on a polyazole selected from the group consisting of polybenzimidazole, poly(pyridine), poly(pyrimidine), polyimidazole, polybenzothiazole, polybenzoxazole, polyoxadiazole, polyquinoxaline, polythiadiazole and poly(tetrazapyrene).

19. The proton-conducting polymer electrolyte membrane according to claim 18, wherein the polyazole has recurring benzimidazole units of one of the following formulae:

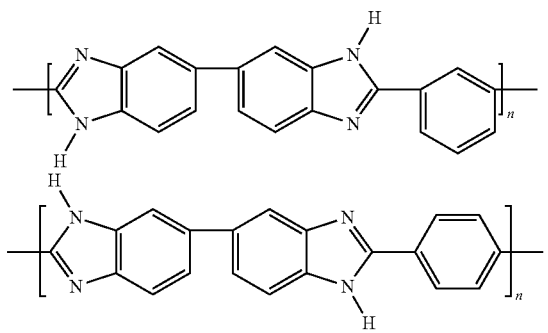

wherein n is an integer ≥10.

20. The proton-conducting polymer electrolyte membrane according to claim 19, wherein n is ≥100.

21. The proton-conducting polymer electrolyte membrane according to claim 13, wherein the polymer electrolyte membrane has reinforcing elements.

22. The proton-conducting polymer electrolyte membrane according to claim 21, wherein the polymer electrolyte membrane is fiber-reinforced.

23. The proton-conducting polymer electrolyte membrane according to claim 21, wherein the proportion by volume of the reinforcing elements, based on the total volume of the polymer electrolyte membrane, is from 5% by volume to 95% by volume.

24. A membrane-electrode assembly comprising at least two electrochemically active electrodes which are separated by a polymer electrolyte membrane, wherein the polymer electrolyte membrane is a proton-conducting polymer electrolyte membrane according to claim 13.

25. A fuel cell comprising at least one membrane-electrode assembly according to claim 24.

26. The proton-conducting polymer electrolyte membrane according to claim 1, which further comprises reinforcing elements which comprise monofilaments, multifilaments, long fibers and/or short fibers, hybrid yarns and/or bicomponent fibers.

27. The proton-conducting polymer electrolyte membrane according to claim 1, which further comprises fibers, and a reinforcing element which optionally forms a textile sheet.

28. The proton-conducting polymer electrolyte membrane according to claim 13, wherein organic acid is perfluorinated phenol.

29. The proton-conducting polymer electrolyte membrane according to claim 1, wherein organic acid is pentafluorophenol.

* * * * *